Dec. 29, 1964   J. R. LISANKIE ETAL   3,163,498
QUENCH APPARATUS FOR REACTOR TUBE EXITS
Filed Oct. 6, 1961   2 Sheets-Sheet 2
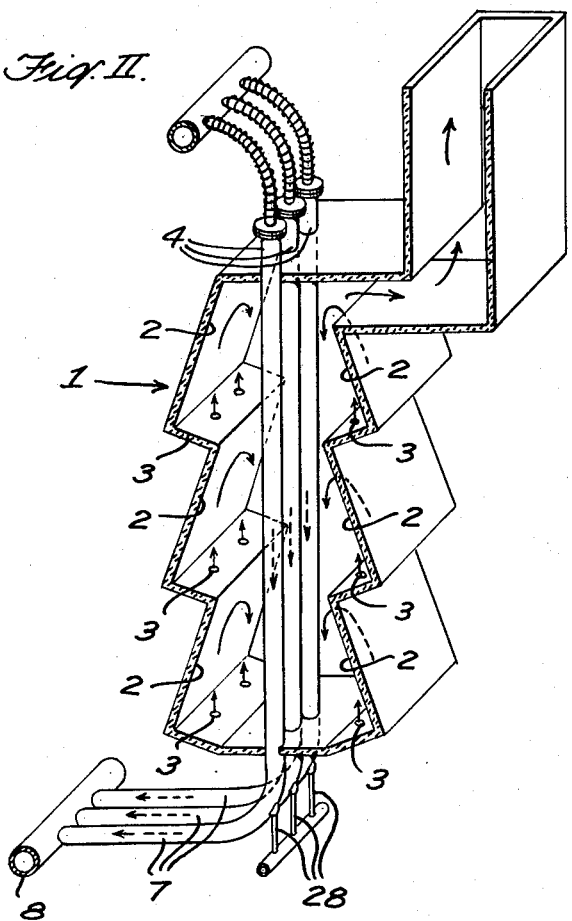
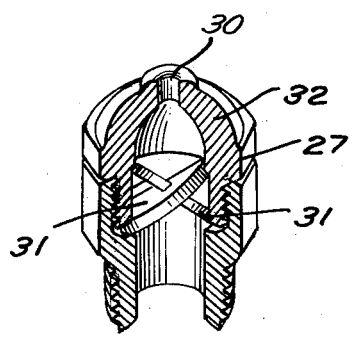
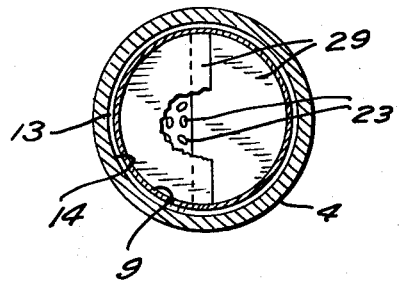
INVENTORS
JEROME R. LISANKIE
PETER VON WIESENTHAL
BY
ATTORNEY

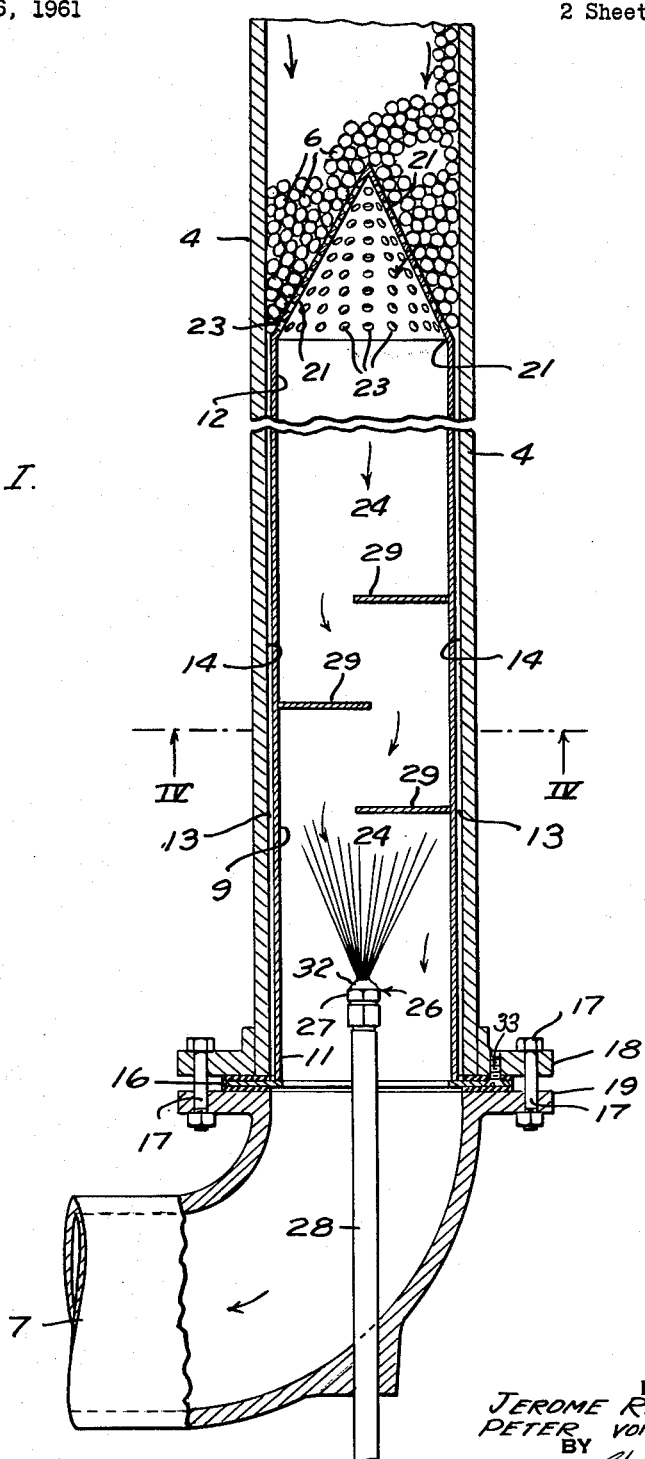
Fig. I.
INVENTORS
JEROME R. LISANKIE
PETER VON WIESENTHAL
BY
ATTORNEY

United States Patent Office 3,163,498
Patented Dec. 29, 1964

3,163,498
QUENCH APPARATUS FOR REACTOR TUBE EXITS
Jerome R. Lisankie, Floral Park, and Peter von Wiesenthal, New York, N.Y., assignors to Foster Wheeler Corporation, New York, N.Y., a corporation of New York
Filed Oct. 6, 1961, Ser. No. 143,496
3 Claims. (Cl. 23—288)

This invention relates to quenching of hot gases. More particularly, it is a quench apparatus mounted at the downstream end of a hot reactor tube.

In prior quench arrangements, intense tube heat compelled deferment of quenching until the product gas had been conducted out of harm's way. Logically a need for quenching at the reactor tube exit could be realized, but several obstacles confronted the development of this scheme. Cooling fluids could subject hot tubes to devastating thermal stresses. Wetting a hot catalyst would fracture its grains reducing the effective flow area offered to the process gas. Further, individual quenches for each tube would run up the capital cost of a reactor.

The present invention accomplishes quenching in a shell means which is insulated from the tube and which defines a chamber at the downstream end of a reactor tube. Hot gas is admitted from the tube into the chamber. After being cooled in the chamber, the quenched gas is exhausted therefrom.

Basically, this advance situates quenching at the ideal location in the flow path of many reactions, that is, immediately following peak temperature. Tubes, themselves, are spared from thermal stresses by internal sleeves which are made thin enough to relieve stresses by deforming. Baffles protect hot catalyst in the tubes from contact with cooling fluid.

Another advantage of this design is that the individual cooling means make feasible the use of less heat resistant material for the outlet conduits. Here the critical design consideration would be burned out of the outlet conduit in the event of a malfunction in the cooling means. This condition is met by making the outlet conduits large enough so that gas flow is sufficiently slowed down. Then, in the event quenching fails, the conductive heat flux input from the gas to the conduit (which depends upon gas velocity) is less than the radiant and convective flux output from the conduit's exterior. This heat input-output relationship obviates high temperature of the conduit so that less expensive materials may here be employed without loss of structural integrity.

These and other advantages will appear more fully from the accompanying drawings wherein:

FIGURE I shows an enlarged sectional view of a quench apparatus as contemplated by this invention and disposed at the downstream end of a reactor tube.

FIGURE II illustrates somewhat schematically a preferred type of fired heater which incorporates the present advance.

FIGURE III is an enlarged isometric view partly in section of a spray nozzle particularly suited to quenching service.

FIGURE IV is a sectional view taken along line IV—IV of FIGURE I.

In the fired heater generally designated 1 in FIGURE II, a gas receives radiant energy emitted from planar surfaces 2 which are heated by burners 3. The gas is conducted downstream through parallel tubes 4 filled with catalyst 6 as shown in FIGURE I and leaves via outlet conduits 7 to collection manifold 8.

Shell means are best shown in FIGURE I as elongated sleeve 9 which has lower end 11 and upper end 12. Sleeve 9 is made of a relatively thin guage material as compared with the tube thickness so that the sleeve may deform thereby relieving thermal stresses. Annular space 13 between sleeve 9 and tube wall 14 serves as an insulation means to provide a barrier to heat transfer from tube 4 to sleeve 9.

The sleeve depends from tube 4. Lateral flange 16 is connected to lower end 11 of sleeve 9. Bolts 17 connect conduit flange 19 to tube flange 18 engaging lateral flange 16 in sandwiched abutment therebetween to mount sleeve 9 with upper end 12 projecting upstream in tube 4. Screws 33 connect lateral flange 16 to tube flange 18 positioning sleeve 9 inside tube 4. Screws 33 and flange 16 maintain support for sleeve 9 when conduit 7 is removed for access to cooling means 26. Hollow conical cap 21 is connected about its base 22 to upper end 12 of sleeve 9 to provide a support for granular catalyst 6 in the vertical tubes. Sleeve 9 is spaced sufficiently close to tube wall 14 so that annular space 13 is not sufficiently wide to admit granular catalyst 6 therein. In this regard, it should be obvious that this apparatus is also adaptable to non-vertical tubes or in exothermal reactors as well as fired heaters wherein catalyst is not employed.

Inlet means for admitting hot gas from tube 4 into chamber 24 are shown as inlet ports 23 in cap 21.

The gas is quenched within chamber 24. Cooling means generally designated 26 include spray nozzle 27 arranged to direct cooling water into chamber 24. Water pipe 28 is operatively connected to nozzle 27 and communicates the nozzle in flow series with a source of cooling water (not shown).

A preferred type of spray nozzle 27 depicted in FIGURE III is made of stainless steel and has internal vanes 31 and orifice 30 in removable cap 32. This type of nozzle offers a full conical spray with uniform distribution. Atomization of water is determined by pressure and capacity.

As seen from FIGURES I and IV, water is prevented from escaping chamber 24 via inlet ports 23 by obstruction means shown as baffles 29 connected to sleeve 9 and arranged therein so that alternate baffles project laterally from opposite sides of sleeve 9. Each baffle terminates in spaced relationship from the opposite wall.

Outlet conduits 7 can be made of less heat resistant material than the tubes and are sized to prevent burnout in the event of the malfunction of the spray means. The sizing slows down the gas, the effective cross section area of the catalyst section of the tube being smaller than the cross section area of the conduit section thereby reducing conductive heat transmission from the hot gas to the conduit to a lower flux rate than the radiant and convection heat emission from the outside of the conduit. By this heat flux relationship, the temperature of conduit 7 remains below a predetermined level so that the material will retain structural integrity even without coolant flow.

It will be understood by those skilled in process engineering and the equipment used therein that changes may be made in the details of this quench arrangement without departing from the invention defined in the claims.

What is claimed is:
1. In combination
 a tube defining a high temperature gas stream reaction zone and a quench zone;
 a granular catalyst within the high temperature tube reaction zone;
 a quench apparatus in said quench zone comprising a sleeve mounted in the tube defining an inner chamber within the tube;
 the sleeve having an upper end, the upper end defining a catalyst support retaining the catalyst above said inner chamber and in the reaction zone;
 the sleeve defining at least one inlet port to said inner chamber in flow communication with the tube reaction zone for admitting the hot gas stream from the reaction zone into the inner chamber;

outlet means for exhausting the gas stream from the inner chamber;

support means supporting the sleeve coaxially within the tube and in spaced relationship with the tube to define an annular region therebetween insulating the tube from the sleeve, the annular region being sufficiently small to prevent circulation of hot gases within the region, said support means closing at least one end of the annular region;

the sleeve being made of relatively thin material by comparison with the tube so that the sleeve may deform thereby relieving thermal stresses imposed by differences in temperature between the tube and the sleeve;

a spray nozzle arranged to direct cooling fluid into the chamber to cool the gas stream passing therethrough, the spray nozzle communicating in flow series with a source of cooling fluid;

the chamber and nozzle arranged so that the chamber confines the cooling fluid whereby the high temperature tube is not subjected to direct contact with the cooling fluid.

2. A tube according to claim 1 wherein the catalyst particles have a predetermined diameter, the annular region being sufficiently narrow to prevent the flow of catalyst into the annular region.

3. A tube according to claim 2 wherein the tube is vertically oriented, the support means being at the lower end of said annular region, said catalyst support being conical, the apex of which is directed upwardly into the gas stream.

References Cited in the file of this patent
UNITED STATES PATENTS

| | | | |
|---|---|---|---|
| 2,421,761 | 6/47 | Rowland et al. | 261—116 |
| 2,514,529 | 7/50 | Weber | 261—117 |
| 2,522,026 | 9/50 | Evans | 48—196 X |
| 2,679,542 | 5/54 | Dorsey | 23—284 X |
| 2,795,108 | 6/57 | Saldin | 138—148 X |
| 2,808,319 | 10/57 | Huff | 23—288 X |
| 2,982,311 | 5/61 | Haskell | 138—148 X |
| 2,986,454 | 5/61 | Jewett | 23—288 |
| 3,000,711 | 9/61 | Eastman et al. | 48—206 X |
| 3,010,807 | 11/61 | Christensen et al. | 23—288 |

MORRIS O. WOLK, *Primary Examiner.*

GEORGE D. MITCHELL, *Examiner.*